United States Patent
Stakoe et al.

(10) Patent No.: US 9,340,143 B2
(45) Date of Patent: May 17, 2016

(54) ADJUSTABLE CARGO TRACK SYSTEM ON SIDE PANEL

(71) Applicant: Ford Global Technologies, LLC, Dearborn, MI (US)

(72) Inventors: John Andrew Stakoe, Bloomfield Hills, MI (US); Mahesh Bhattacharyya, Novi, MI (US); Ryan Kurrle, Royal Oak, MI (US); William Bauer, Canton, MI (US); Timothy Barr, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/469,667

(22) Filed: Aug. 27, 2014

(65) Prior Publication Data

US 2016/0059765 A1    Mar. 3, 2016

(51) Int. Cl.
*B60R 7/02* (2006.01)
*B60R 5/04* (2006.01)
*B60P 7/08* (2006.01)
*B60P 7/06* (2006.01)

(52) U.S. Cl.
CPC ............... *B60P 7/0807* (2013.01); *B60P 7/06* (2013.01); *B60P 7/0815* (2013.01); *B60P 7/0876* (2013.01); *B60R 5/04* (2013.01); *B60R 7/02* (2013.01)

(58) Field of Classification Search
CPC ............. B60R 7/02; B60R 7/08; B60R 7/005; B60R 13/01; B60R 5/04; B60R 5/048; B60R 5/045; B60P 7/08; B60P 7/0807; B60P 7/0815; B60P 7/0876

USPC ............. 296/36.1, 36.13, 36.16, 24.44, 37.6, 296/37.1, 37.13, 37.16; 224/404, 405, 281, 224/484, 500, 501, 510, 511, 517, 533, 534, 224/324–326, 545, 547–549, 55, 560, 567, 224/574, 568, 571
See application file for complete search history.

(56) References Cited

U.S. PATENT DOCUMENTS

| | | | |
|---|---|---|---|
| 4,540,213 A | | 9/1985 | Herlitz et al. |
| 5,180,089 A | * | 1/1993 | Suman et al. ............. 224/547 |
| 5,520,316 A | | 5/1996 | Chen |
| 5,715,978 A | * | 2/1998 | Ackeret ..................... 224/42.33 |
| 5,915,777 A | * | 6/1999 | Gignac et al. ............. 296/37.16 |
| 6,041,945 A | | 3/2000 | Faraj |
| 6,099,222 A | | 8/2000 | Moore |
| 6,113,172 A | * | 9/2000 | Chaloult et al. ........... 296/26.08 |
| 6,585,465 B1 | * | 7/2003 | Hammond et al. ......... 410/104 |
| 6,811,196 B2 | | 11/2004 | Gammon |
| 6,846,140 B2 | * | 1/2005 | Anderson et al. .......... 410/104 |
| 7,028,872 B2 | | 4/2006 | Lobanoff |
| 7,214,018 B2 | | 5/2007 | Lussier |
| 7,731,026 B2 | * | 6/2010 | Harrison ..................... 206/349 |

(Continued)

FOREIGN PATENT DOCUMENTS

| | | | | |
|---|---|---|---|---|
| JP | 2010-167810 | * | 8/2010 | ............ B60R 5/04 |
| WO | 2006067468 A1 | | 6/2006 | |

*Primary Examiner* — Gregory Blankenship
(74) *Attorney, Agent, or Firm* — Vichit Chea; Price Heneveld LLP

(57) ABSTRACT

A cargo retention apparatus for a vehicle includes a vehicle panel defining an interior, an exterior, and an elongate slot open between the interior and exterior that extends in a first direction therealong. A track member is disposed on the interior of the panel and is aligned with the slot in the first direction. The apparatus further includes a hook having a base received through the slot and slidably coupled with the track member.

17 Claims, 4 Drawing Sheets

(56) References Cited

U.S. PATENT DOCUMENTS

| | | | |
|---|---|---|---|
| 7,819,295 B2* | 10/2010 | Plavetich | 224/403 |
| 7,862,269 B2* | 1/2011 | Kovie | 410/121 |
| 7,891,729 B2* | 2/2011 | Fujishima et al. | 296/218 |
| 8,505,794 B2* | 8/2013 | Ardigo | 224/543 |
| 2002/0048495 A1 | 4/2002 | Anderson et al. | |
| 2005/0092801 A1* | 5/2005 | Hicks et al. | 224/547 |
| 2006/0226189 A1* | 10/2006 | Lussier | 224/404 |
| 2008/0277957 A1* | 11/2008 | Hirayama et al. | 296/37.16 |
| 2009/0243322 A1* | 10/2009 | Vance | B60R 13/01 296/39.1 |
| 2011/0057468 A1* | 3/2011 | Denton et al. | 296/37.16 |
| 2013/0126696 A1* | 5/2013 | Decorme et al. | 248/499 |

* cited by examiner

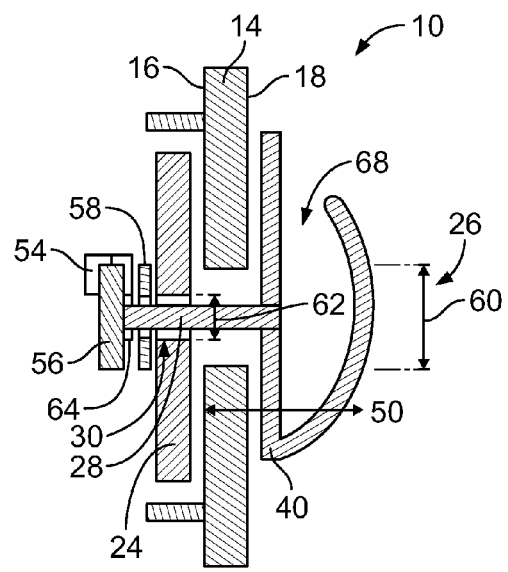
FIG. 2
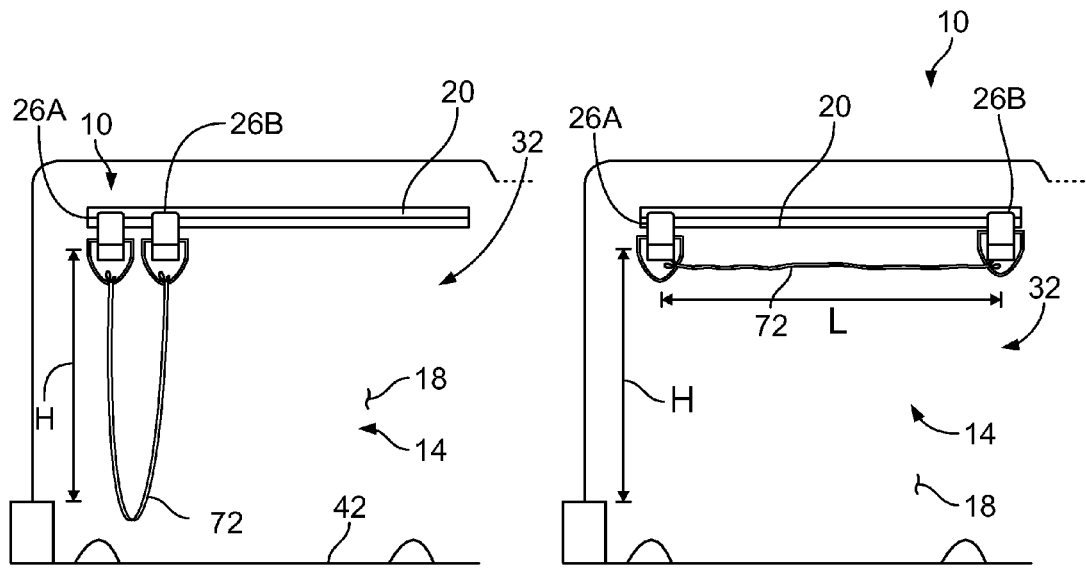
FIG. 3  FIG. 4

ADJUSTABLE CARGO TRACK SYSTEM ON SIDE PANEL

FIELD OF THE INVENTION

The present invention generally relates to a system for retaining or supporting objects within a cargo area of a vehicle. In particular, one or more hooks are disposed within the cargo area and slidably coupled to tracks.

BACKGROUND OF THE INVENTION

Motor vehicles and, in particular, automobiles often include a designated area for the storage of items, such as a trunk of a sedan or coupe or a partitioned area of a utility vehicle. Such cargo areas often offer very little, if anything to retain objects in a particular position therein, often leading to items shifting, rolling, or falling over within the cargo area during movement of the vehicle. Such movement can result in damage to objects or spilling of objects out of fallen containers and the scattering thereof about the cargo area.

Various devices have been included in some cargo areas to help retain objects therein. These devices can include cargo nets, which are affixed to the floor of a cargo area and often include a stretchable net designed to retain objects thereunder. Still further, various dividers and organizers have been incorporated into cargo areas to help prevent objects from shifting. However, none of such previously-developed devices offers a user thereof the ability to adjust the components thereof to accommodate both the object to be retained or to fit the particular space of the cargo area. Further, such previous devices are often visibly and physically obtrusive, such that they are not desirable in portions of a cargo area that may overlap with the passenger area of a vehicle. Accordingly, further development is desired.

SUMMARY OF THE INVENTION

According to one aspect of the present invention, a cargo retention apparatus for a vehicle includes a vehicle panel defining an interior, an exterior, and an elongate slot open between the interior and exterior that extends in a first direction therealong. A track member is disposed on the interior of the panel and is aligned with the slot in the first direction. The apparatus further includes a hook having a base received through the slot and slidably coupled with the track member.

According to another aspect of the present invention, a vehicle cargo compartment includes a vehicle interior panel bounding a portion of an interior of the compartment and defining a slot therethrough that extends in a first direction. The compartment further includes a track member disposed on a side of the panel opposite the compartment interior and extending along the slot. A hook is disposed within the compartment interior and has a base extending through the slot and coupling with the track.

According to another aspect of the present invention, a cargo retention system for a vehicle includes a vehicle panel defining an interior and an exterior. The panel has elongate slot therealong that is open between the interior and exterior. The system further includes a track member disposed on the interior of the panel and aligned with the slot and a plurality of hooks, each having a base receivable through the slot and releasably coupleable with the track member.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2 is a cross-sectional view, of the cargo retention apparatus of FIG. 1 taken along line A-A;

FIG. 3 is an elevational view showing one variation in positioning of elements in the cargo retention apparatus of FIG. 1;

FIG. 4 is an elevational view showing another variation in positioning of elements in the cargo retention apparatus of FIG. 1;

DETAILED DESCRIPTION OF THE PREFERRED EMBODIMENTS

Figure 1:
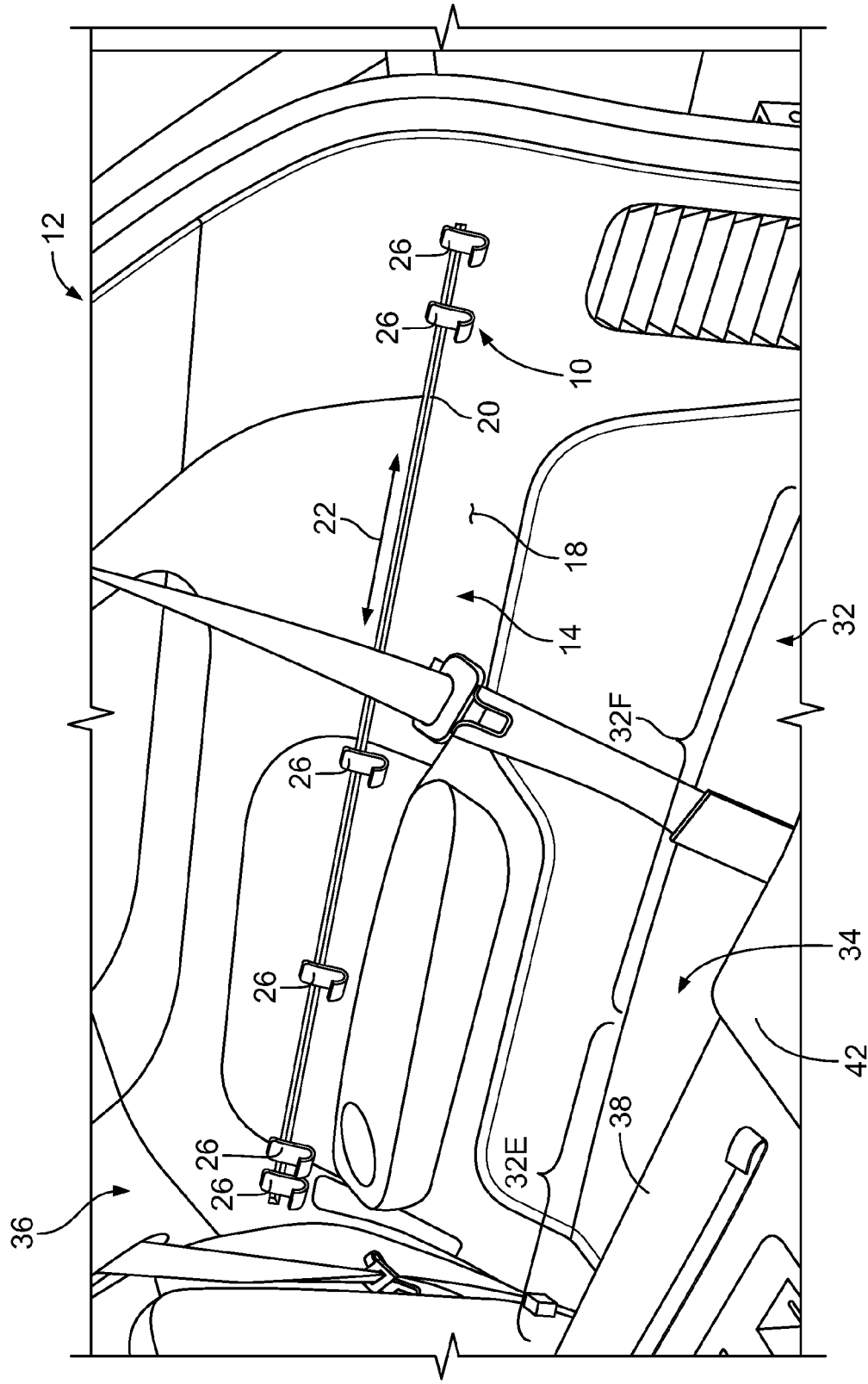
FIG. 1 is a partial perspective view of an interior of a vehicle cargo area including a cargo retention apparatus.

For purposes of description herein, the terms "upper," "lower," "right," "left," "rear," "front," "vertical," "horizontal," "interior," "exterior," and derivatives thereof shall relate to the invention, as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIG. 1, reference numeral 10 generally designates a cargo retention apparatus. As shown, cargo retention apparatus 10 is useable in a vehicle 12 and includes a vehicle panel 14 defining an interior 16, an exterior 18, and an elongate slot 20 open between the interior 16 and exterior 18. Slot 20 is configured to extend along vehicle panel 14 in a first direction 22. Retention apparatus 10 further includes a track member 24 (as shown in FIG. 2) disposed on the interior 16 of panel 14 and aligned with slot 20 in the first direction 22. A hook 26 has a base 28 received through the slot 20 and slidably coupled with track member 24.

As shown in FIG. 1, retention apparatus 10 can be incorporated into the cargo compartment 32 of vehicle 12 such that the vehicle panel 14 bounds a portion of the interior 34 of the cargo compartment 32 with slot 20 disposed toward the interior 34, as defined on the exterior surface 18 of panel 14. Accordingly, by being disposed along interior surface 16 of panel 14, track member 24 is disposed on the side of panel 14 opposite the compartment interior 34. In such an arrangement, track member 24 can provide structural support for any hooks 26 included in apparatus 10. Accordingly, track member 24 can be made from a generally rigid material such as metal or the like, while vehicle panel 14 can be of a material, such as plastic, typically used in such vehicle interior applications. In the arrangement shown, track member 24 is obscured from view from within the interior 34 of cargo compartment 32 by vehicle panel 14. Only slot 20 is, accordingly, visible from within interior 34 of cargo compartment 32. As a result, the presence of cargo retention apparatus 10 is less visually disruptive to the interior 34 of cargo compartment 32, and provides a minimum of additional components present within the interior 34 of cargo compartment 32. Such an arrangement may be advantageous when cargo compartment 32 is a rear portion of a cabin 36 of vehicle 12, as depicted in FIG. 1, in the form of a utility vehicle. In particular, in such a type of vehicle 12, the cargo compartment 32 may be accessible to or visible by occupants of the vehicle cabin 36. In some instances, such as that which is depicted in FIG. 1, a portion of the vehicle cabin 36 may have a dual-purpose as a portion of the vehicle seating area and a portion of the cargo compartment 32. As shown in FIG. 1, vehicle panel 14, along with slot 20 and tack member 24 can extend through a fixed portion of the cargo compartment 32F and an extended portion of cargo compartment 32E. Extended portion of cargo compartment 32E can optionally be included in cargo compartment 32 or included in a portion of the passenger section of vehicle cabin 36, for example by folding and unfolding of a third-row seat 38.

When retention apparatus 10 is used in such a vehicular setting, one or more hooks 26 can be positioned along slot 20 and slidably coupled with track member 24 such that hooks 26 can be arranged in desired positions therealong. In an example, one or more of such hooks 26 can be moved into extended cargo area 32E when vehicle seat 38 is in a stowed position, and can be removed from such area when vehicle seat 38 is in use by an occupant. This arrangement allows for hooks to easily be moved along slot 20, including out of compartment area 32E when it is not being used for storage of cargo within vehicle 12. Further, the hidden arrangement of track member 24 behind vehicle panel 14 provides for reduced obtrusion of apparatus 10 into vehicle cabin 36.

As further illustrated in FIG. 1, and as further mentioned above, the plurality of hooks 26 can be included in retention apparatus 10 and can each include respective bases 28 extending through slot 20 and slidably coupling with track member 24, as shown in FIG. 2. Each of such hooks 26 can be independently slidable along slot 20 and track member 24 to allow a user to customize the positions of hooks within retention apparatus 10. Further, as also shown in FIG. 1, first direction 22 can extend in a generally horizontal direction along vehicle panel 14 and can be positioned in any number of heights H (as shown in FIG. 3, for example) above floor 42 of cargo compartment 32, as further described below. Still further, a number of separate slots 20 and associated track members 24 can be included along vehicle panel 14 at different heights H and extending at different lengths L (as shown in FIGS. 3 and 4), and may each include one or more hooks 26 associated therewith to provide for still further customization of cargo management options provided by retention apparatus 10. As illustrated herein vehicle panel 14 can be a side wall panel of cargo compartment 32, which can further extend into vehicle cabin 36, such that slot 20 and track member 24 are disposed along an interior side of cargo compartment 32. In other examples, vehicle panel 14 can be an interior panel of a lift gate associated with cargo compartment 32, a floor panel, or a ceiling panel extending at least partially within cargo compartment 32. Still further, vehicle panel 14 can be in the form of a rear panel of seat 38. In a still further example vehicle 12 can be in the form of a passenger car having a cargo compartment 32 in a trunk separate from vehicle cabin 36. In such an example, vehicle panel 14 can be side panels within the cargo compartment 32 a seat back panel open to the interior 34 of cargo compartment 32 or panel positioned on the underside of a rear deck positioned behind passenger seat 38.

As further shown in FIG. 2, cargo retention apparatus 10 can be configured such that hook 26 can be alternately maintained in a user-selected position or freely moved by sliding hook 26 along slot 20 and track member 24. In the embodiment shown, such selective locking and sliding of hook 26 can be achieved, in part, by configuring hook 26 such that base 28 thereof is moveable with respect to track member 24 in a direction 50 that is generally perpendicular to exterior surface 18 of vehicle panel 14. Further, base 28 may be biased, such as by a spring 64 associated therewith, such that body 40 of hook 26 is retained against and in contact with exterior 18 of vehicle panel 14 under the force of spring 64. In some embodiments it may be possible that in such an arrangement friction between body 40 of hook 26 and exterior 18 of vehicle panel 14 can retain hook 26 in a desired position. Such friction can be removed by a user pulling outwardly in direction 50 on hook body 40 so as to move hook 26 in direction 50 away from exterior 18 of panel 14, at which point the user can slide hook 26 along direction 22 to a new position, which can be maintained by releasing hook 26.

In the example shown in FIG. 2, the ability of retention apparatus 10 to maintain a selected position of hook 26 with respect to track member 24 can be further achieved by the incorporation of a number of blocks 54 along track member 24, spaced apart at intervals at first direction 22. Such blocks 54 can be positioned such that a stopper 56 coupled with base 28 of hook 26 is positioned between successive blocks 54 when in a rest position wherein spring 64 biases hook body 40 against exterior 18 of vehicle panel 14. Accordingly blocks 54 can obstruct sliding movement of hook 26 along track member 24. A user can selectively pull outwardly on hook 26 so as to move hook body 40 away from exterior surface 18, which also moves stopper 56 out of a position between successive blocks 54 such that hook 26 may be slid in first direction 22 along track member 24 and slot 20. When hook 26 reaches a new desired position, the user can release hook body 40, thereby allowing spring 64 to move stopper 56 into a corresponding position between other adjacent blocks 54, thereby retaining hooks 26 in a new user-selectable position thereof.

Further, the one or more hooks 26 included in retention apparatus 10 can be made to be removable therefrom. As shown in FIG. 2, this can be achieved by incorporating one or more tabs 58 on base 28 of hook 26 in the example shown, tab 58 can be slidable with respect to the adjacent portion of base 28 and can be biased against interior surface 16 of panel 14 by spring 64. Tab 58 can have a width (in the direction in and out of the page as shown in FIG. 2) that corresponds to a height 62 of the opening 30 in track member 24. Further, tab 58 can have a length 60 that is greater than height 62 of opening 30 such that, when hook 26 is in the position shown in FIG. 2, tab 58 restricts movement of hook 26 in direction 50 to a distance permitted by compression of spring 64 by stopper 56. The width of tab 58 is further such that, if hook 26 is rotated such that tab 58 aligns along the length 60 thereof with direction 22 (such as by rotation of hook 26 through about 90 degrees), tab 58 can be moved through the opening 30 in track member 24, thereby permitting hook 26 to be removed from track member 24, and further moved from out of slot 20 so as to disengage hook 26 from retention apparatus 10. Stopper 56 can be dimensioned in a manner similar to tab 58 to allow stopper 56 to also pass through the opening 30 in track member 24 and through slot 20 during removal of hook 26 from retention apparatus 10. Such a configuration allows multiple hooks 26 to be provided in a system with vehicle panel 14 and corresponding slot 20 and track member 24, or multiples thereof, such that a user-determined number of hooks 26 can be coupled with track member 24 to provide a customized system according to the various needs of the user. In various examples, hooks 26 can be positioned in advantageous locations through various articles such as grocery bags or other compatible containers or articles.

Figure 5:
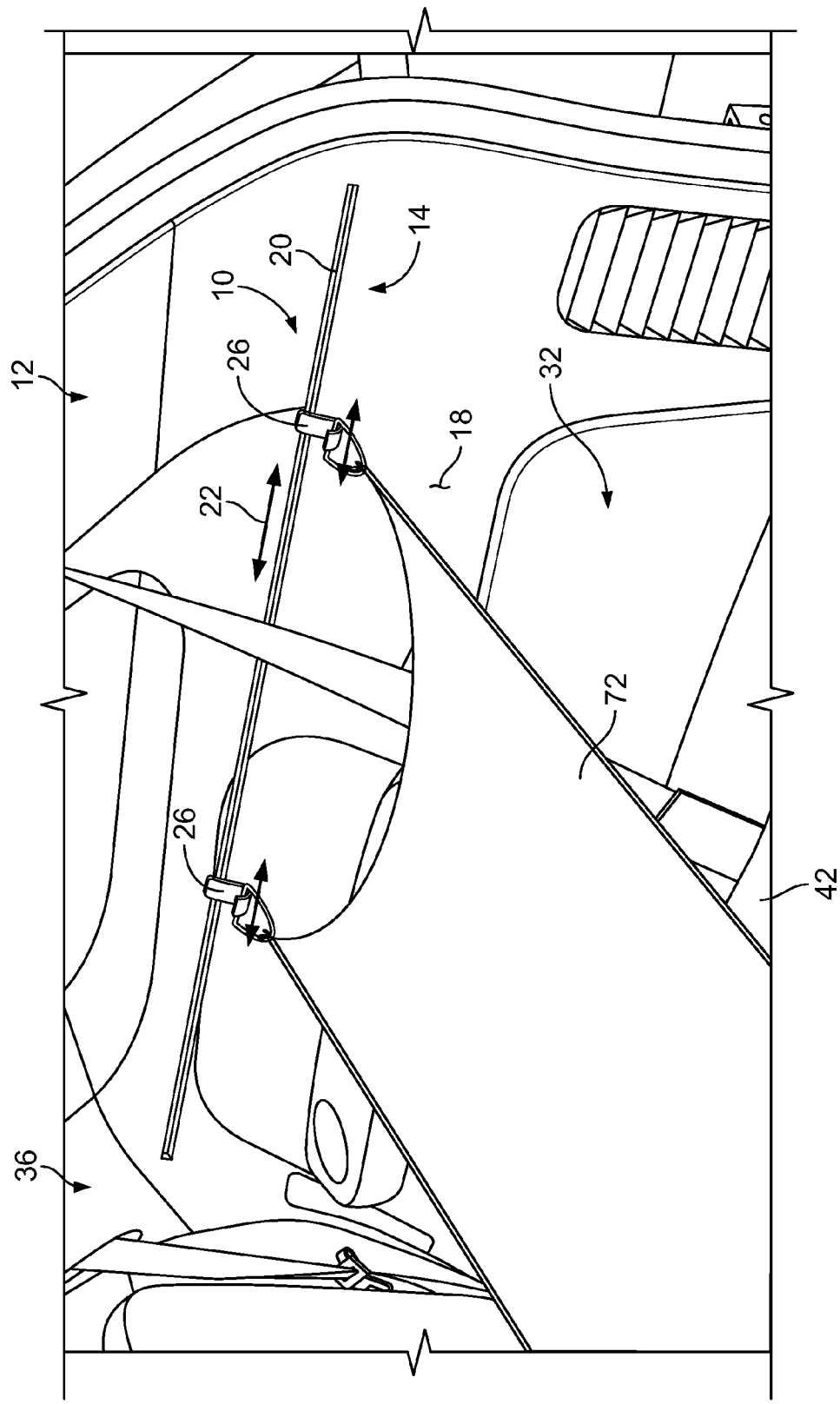
FIG. 5 is the partial perspective view of the vehicle cargo area including the cargo retention apparatus of FIG. 1 used with a cargo cover.

As shown in FIGS. 3-5, retention apparatus 10 can be used in conjunction with a compatible flexible substrate, in the form of a multi-use combination cover and net 72. As shown, net 72 can be generally solid in structure, such as from being comprised of fabric, plastic, various other polymers or the like. Similarly, net 72 can comprise, in whole or in part, material in the form of a mesh, a network of coupled filaments, or the like. As shown in FIGS. 3 and 4, the adjustment of hooks 26 along retention apparatus 10 can allow for net 72 to be used in multiple modes. For example, as shown in FIG. 3 two hooks 26A and 26B can be positioned adjacent one another along a portion of slot 20 and track member 24 such that net 72 depends downwardly therefrom in the form of a pouch or the like. It is noted that a similar arrangement of hooks 26 along a second retention apparatus 10 can be positioned on an opposite side of net 72 from retention apparatus 10 shown in FIG. 3 so that net 72 can be suspended along a width of cargo compartment 32. In such a configuration, net 72 can be used to retain various articles therein in a desired location and suspended above floor 42 of cargo compartment 32.

As further shown in FIG. 4, an additional mode of use for net 72 can be achieved with the same combination of retention apparatuses 10 used in FIG. 3, by positioning hook 26B at a location remote from hook 26A such that net 72 is suspended above floor 42. This arrangement is such that net 72 can function as a cover to obstruct from view any objects positioned below net 72 within cargo compartment 32. In an example, to facilitate use of net 72 and such multiple configurations, track member 24 and slot 20 can be positioned along vehicle panel 14 such that first direction 22 extends generally horizontally within cargo compartment 32 and such that slot 20 and track member 24 are positioned at a height H above floor 42 at least equal to one half of the length L of net 72, as shown in FIG. 4. Such an arrangement is further shown in FIG. 5 wherein track member 24 and slot 20 are longer than length L of net 72 such that net 72 can be positioned, as desired by a user at any location within cargo compartment 32. As shown in the Figures, hooks 26 may have an opening 68 along the perimeter thereof, as defined by body 40 that is directed generally upwardly such that net 72 can be generally retained thereon by gravity.

Other positions of slots 20 and corresponding tracks members 24 can be positioned at other locations along vehicle panel 14 to facilitate use of net 72 in additional positions. For example, a slot 20 and corresponding track member 24 can be positioned adjacent floor 42 of cargo compartment 32 such that net 72 can be used as a cargo net to maintain a position of loose items placed on floor 42. In such an example and other similar examples, it may useful for hook 26 to be oriented along direction 22 or to further include a clip member (not shown) thereon such that net 72 can be retained thereon.

Figure 6:
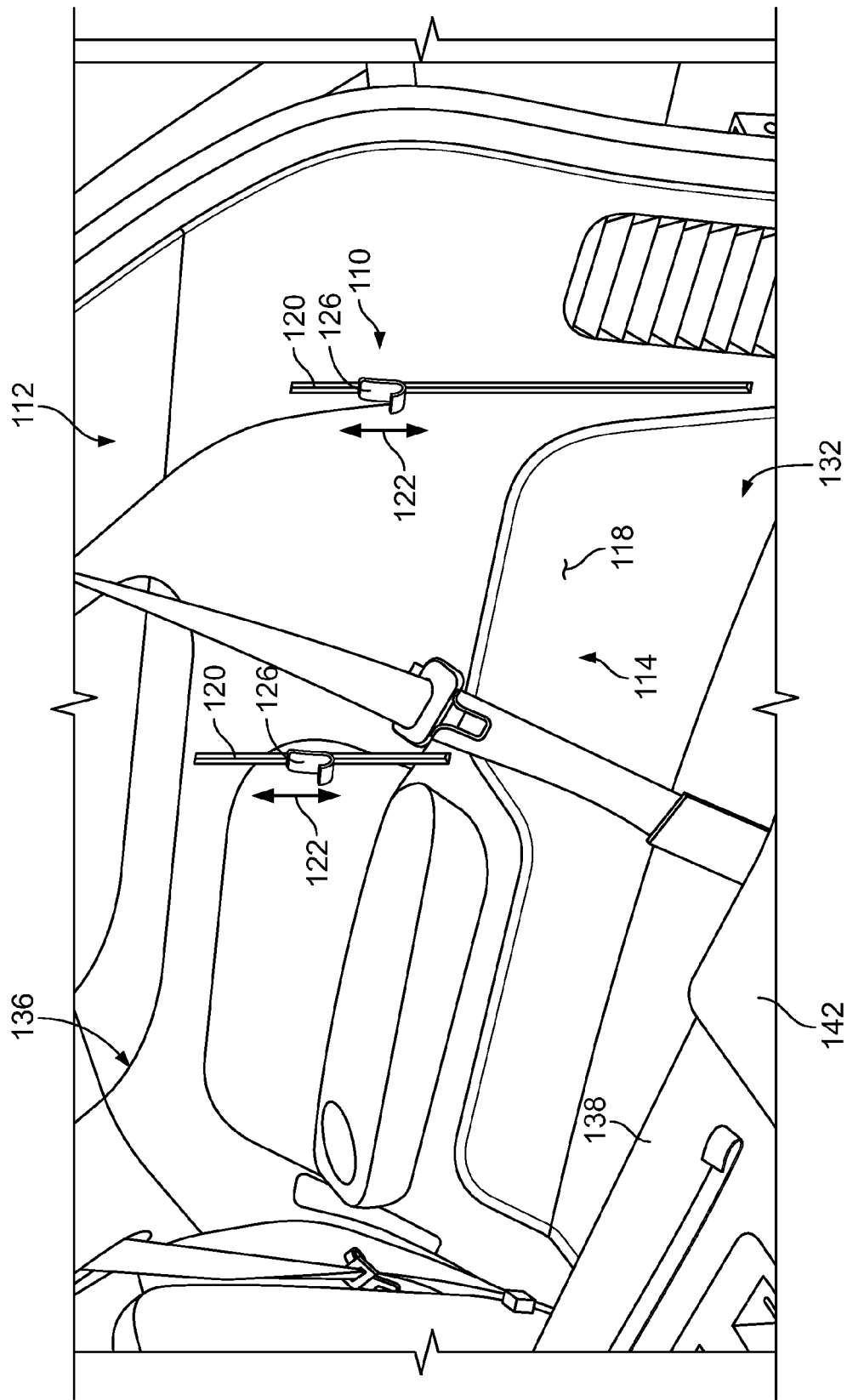
FIG. 6 is a partial perspective view of an interior of a vehicle cargo area including an alternative cargo retention apparatus.

As shown in FIG. 6, another embodiment of retention apparatus 110 can include multiple slot 120 and track 124 pairs arranged vertically along vehicle panel 114 such that hooks 126 respectively coupled therewith are slidable in a vertical direction 122 as shown, multiple slot 120 and track 124 combinations can be included along vehicle panel 114 and can vary in lengths to provide various combinations of customization by movement of hooks 126 thereon by a user. The slots 120 and track members 124 can be similar in construction to slots 20 and track members 24, described above, and can provide for similar selective locking and unlocking of the positions of hooks 126 coupled therewith. In an example, the relative positioning of slot 120 and track 124 combinations can be adjusted for use in connection with a net similar to net 72 shown in FIGS. 3-5, to retain such a net 72 in various positions with respect to cargo compartment 132 and to provide various functionalities similar to those described above with reference to FIGS. 3-5. In an example, hooks 126 can be slidable along respective slots 120 such that a net 72 coupled therebetween (and with similarly spaced hooks on an opposite vehicle panel within cargo compartment 132) can selectively retain the net 72 in the position of either a cargo retention net or a cargo cover. Still further such orientation of slots 120 and tracks 124 can provide for height adjustment of hooks 126 that can be selected by a user to correspond to varying heights of objects to be retained thereby. In a further embodiment, various combinations of similar slots and tracks coupled with corresponding hooks can be positioned along a single vehicle panel so as to extend in different directions therein.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

We claim:

1. A cargo retention apparatus for a vehicle, comprising:
a vehicle panel defining an interior, an exterior defining portions of a vehicle cargo area and a passenger compartment, and a slot open between the interior and exterior that extends in a first direction within the cargo area and the passenger compartment;
a track member disposed on the interior of the panel and aligned with the slot in the first direction; and
a hook having a base received through the slot and slidably coupled with the track member and a body extending away from the base, the slidable coupling of the base of the hook with the track member being such that the body of the hook is biased toward the exterior of the vehicle panel and into contact therewith.

2. The cargo retention apparatus of claim 1, wherein the hook is one of a plurality of hooks, each having respective bases received through the slot and slidably coupled with the track member.

3. The cargo retention apparatus of claim 1, wherein the biasing of the base toward the exterior of the vehicle panel biases the hook toward a blocked position such that sliding of the hook along the track is restricted.

4. The cargo retention apparatus of claim 3, wherein the hook can be selectively moved out of the blocked position by movement of the hook such that the base is disposed away from the exterior of the vehicle panel.

5. The cargo retention apparatus of claim 1, wherein the base is slidably coupled with the track in a removable manner.

6. The cargo retention apparatus of claim 5, wherein:
the base includes a tab that can be alternately extended over the track and aligned with the track;
when extended over the track, the base is slidably coupled with the track member; and
when aligned with the track, the base is releasable with respect to the track member.

7. The cargo retention apparatus of claim 1, wherein the body of the hook comprises a plastic material and defines an opening along a perimeter thereof.

8. A vehicle compartment, comprising:
a vehicle interior panel defining a slot therethrough extending in a first direction;
a track member disposed on a side of the panel opposite the compartment interior and extending along the slot; and
a hook disposed within the compartment interior and having a body and a base, the base extending through the slot and coupling with the track to bias the body toward and into contact with the vehicle panel.

9. The vehicle cargo compartment of claim 8, wherein the track is obscured from view by the vehicle interior panel at an exterior thereof.

10. The vehicle cargo compartment of claim 8, wherein the first direction is generally horizontally disposed within the interior of the compartment.

11. The vehicle cargo compartment of claim 8, wherein:
the slot defined through the vehicle interior panel is one of a plurality of slots;
the at least one of the plurality of slots extends in a second direction that is generally vertically disposed within the interior of the compartment;
the track member is one of a plurality of track members, each extending along a respective one of the plurality of slots; and
the hook is one of a plurality of hooks disposed within the compartment interior and having respective bases extending through respective ones of the slots and coupling with corresponding ones of the track members.

12. The vehicle cargo compartment of claim 8, wherein the compartment is a rear portion of a cabin in a utility vehicle including the cargo area and the passenger area, the vehicle interior panel bounding portions of the cargo area and the passenger area.

13. A cargo retention system for a vehicle, comprising:
a vehicle panel defining an interior and an exterior, the panel including a slot therealong and open between the interior and exterior, the slot disposed at a height above a floor of the vehicle;
a track member disposed on the interior of the panel and aligned with the slot;
a plurality of hooks, each having a base and a body extending away from the base, the base being receivable through the slot, such that the body of the hook is biased toward the exterior of the vehicle panel and into contact therewith, and releasably coupleable with the track member; and
a flexible substrate coupleable with at least one of the plurality of hooks and when the base thereof is releasably coupled with the track member.

14. The cargo retention system of claim 13, wherein each of the plurality of hooks is releasably coupleable with the track member in a first mode wherein the respective hook is slidable along track and a second mode wherein the hook is maintained in a user-selectable position along the track.

15. The cargo retention system of claim 13, wherein:
the exterior of the vehicle panel defines a portion of a cargo area of the vehicle; and
a combination of two hooks are positionable along the track member by releasable coupling of the bases thereof with the track at a distance substantially equal to a length of a first side of the substrate so as to retain the first side of the substrate in a position of a cargo cover within the cargo area.

16. The cargo retention system of claim 15, wherein the combination of two hooks are further positionable along the track member adjacent to one another to retain the first side of the substrate in a position of a storage net.

17. The cargo retention system of claim 13, wherein the length is less than or equal to twice the height.

* * * * *